Nov. 20, 1962     L. M. HUDSON     3,064,533

PHOTOGRAPHIC OBJECTIVE

Filed May 16, 1960

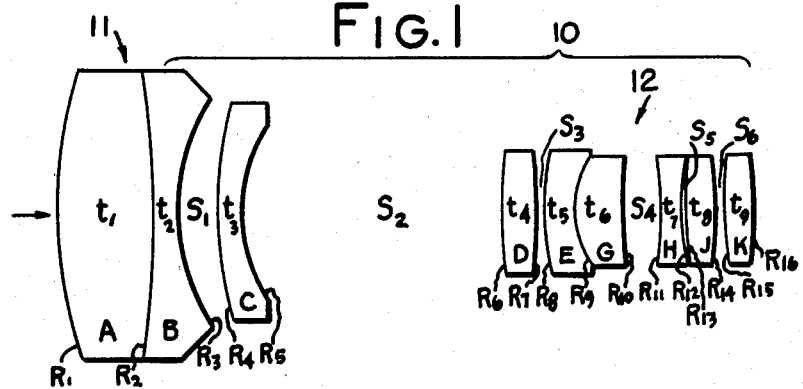

| E.F.L.=10mm | B.F.=13.21mm | f/1.8 | F.A.=64° | | |
|---|---|---|---|---|---|
| LENS | CURVATURES | THICKNESS | SPACING | $n_D$ | $v$ |
| A | $R_1$= 34.18 | $t_1$=6.87 | $S_1$=3.13 | 1.720 | 47.5 |
|  | $R_2$=-479.83 |  |  |  |  |
| B | $R_3$= 14.56 | $t_2$=1.52 |  | 1.498 | 67.0 |
| C | $R_4$= 28.63 | $t_3$=1.33 | $S_2$=24.07 | 1.720 | 42.0 |
|  | $R_5$= 11.73 |  |  |  |  |
| D | $R_6$= 23.59 | $t_4$=2.05 | $S_3$=.04 | 1.720 | 47.5 |
|  | $R_7$=-225.56 |  |  |  |  |
| E | $R_8$= 13.24 | $t_5$=1.59 | $S_4$=2.27 | 1.651 | 55.8 |
|  | $R_9$= 5.37 |  |  |  |  |
| G | $R_{10}$= 21.81 | $t_6$=2.96 |  | 1.691 | 54.8 |
| H | $R_{11}$=-20.60 | $t_7$=1.32 | $S_5$=.46 | 1.7506 | 27.8 |
|  | $R_{12}$= 11.31 |  |  |  |  |
| J | $R_{13}$= 21.51 | $t_8$=1.91 |  | 1.657 | 57.2 |
|  | $R_{14}$=-16.76 |  |  |  |  |
| K | $R_{15}$= 18.41 | $t_9$=1.54 | $S_6$=.04 | 1.657 | 57.2 |
|  | $R_{16}$=-67.48 |  |  |  |  |

FIG. 3

| E.F.L.=10mm | B.F.=13.43mm | f/2.0 | F.A.=64° | | |
|---|---|---|---|---|---|
| LENS | CURVATURES | THICKNESS | SPACING | $n_D$ | $v$ |
| A | $R_1$= 23.27 | $t_1$=4.67 | $S_1$=2.13 | 1.720 | 47.5 |
|  | $R_2$=-326.66 |  |  |  |  |
| B | $R_3$= 10.17 | $t_2$=1.02 |  | 1.511 | 63.5 |
| C | $R_4$= 18.72 | $t_3$=0.89 | $S_2$=13.40 | 1.691 | 54.8 |
|  | $R_5$= 7.65 |  |  |  |  |
| D | $R_6$= 19.46 | $t_4$=1.69 | $S_3$=0.03 | 1.720 | 47.5 |
|  | $R_7$=-186.14 |  |  |  |  |
| E | $R_8$= 10.93 | $t_5$=1.31 | $S_4$=1.87 | 1.651 | 55.8 |
|  | $R_9$= 4.43 |  |  |  |  |
| G | $R_{10}$= 18.00 | $t_6$=2.43 |  | 1.691 | 54.8 |
| H | $R_{11}$=-15.65 | $t_7$=1.08 | $S_5$=0.37 | 1.7506 | 27.8 |
|  | $R_{12}$= 9.80 |  |  |  |  |
| J | $R_{13}$= 16.11 | $t_8$=1.57 |  | 1.657 | 57.2 |
|  | $R_{14}$=-14.94 |  |  |  |  |
| K | $R_{15}$= 20.09 | $t_9$=1.27 | $S_6$=0.03 | 1.657 | 57.2 |
|  | $R_{16}$=-28.19 |  |  |  |  |

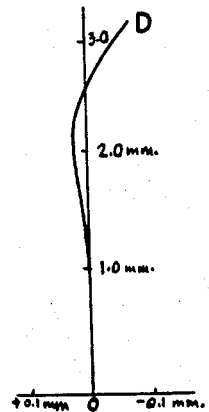

FIG. 4

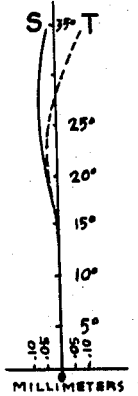

FIG. 5

LENA M. HUDSON
*INVENTOR.*

BY *Frank C. Parker*

*ATTORNEY*

United States Patent Office 3,064,533
Patented Nov. 20, 1962

3,064,533
PHOTOGRAPHIC OBJECTIVE
Lena M. Hudson, Brighton, N.Y., assignor to Bausch & Lomb Incorporated, a corporation of New York
Filed May 16, 1960, Ser. No. 29,263
2 Claims. (Cl. 88—57)

This invention relates to a photographic objective and more particularly it relates to objectives having a long back focus for use in reflex cameras.

It is an object of this invention to provide a novel photographic objective having a back focal length which exceeds the equivalent focal length by at least 30%.

It is a further object to provide such a device having a relative aperture as large as $f/2.0$ and an angular field coverage of at least 60° together with superior correction of spherical and chromatic aberration, astigmatism, coma, distortion and field curvature.

Further objects and advantages will be found in the details of construction and combination of parts by reference to the specification herebelow together with the accompanying drawing wherein:

FIG. 1 is an optical diagram representing a form of my invention;

FIG. 2 is a table of constructional data describing one form of my invention;

FIG. 3 is a second table of constructional data describing a second form of my invention;

FIG. 4 is a plotted curve showing the state of correction of spherical aberration using light in the D part of the spectrum; and FIG. 5 is a plotted curve showing the state of correction of astigmatism, sagittal and tangential astigmatic conditions being shown by the solid line 5 and dotted line T, respectively.

Although there are numerous photographic objectives in the prior art which have a back focal length which is considerably greater than the equivalent focal length, few of these objectives have additionally a wide angular field of at least 60° or a large relative aperture as great as $f/1.8$. In designing a photographic objective having a back focal length which is 30% longer than the equivalent focal length, it has been found necessary in the past to sacrifice a wide angular field to obtain a large relative aperture.

In the present invention, extensive development and experimentation has provided an optical system having the aforementioned wide angular field of more than 60°, large relative aperture of at least $f/2.0$ and long back focus and additionally having a superior correction for chromatic and spherical aberrations, coma, astigmatism, distortion and field curvature. Said superior correction for spherical aberration and for astigmatism is particularly well illustrated in the graphic curves which constitute FIGS. 4 and 5, respectively, the astigmatism being plotted for a field of 32° half angle. Such an optical system or objective is designated generally by the numeral 10 in the drawing and said system comprises a front doublet lens AB, located on the long conjugate side of said system. Doublet AB is meniscus shaped with its concave side facing rearwardly. Spaced rearwardly and in optical alignment therewith is a single meniscus lens C, the concave side thereof facing rearwardly. The two aforesaid lenses constitute a forward lens group 11 which is optically aligned with and spaced from a second lens group which is designated by numeral 12.

Constituting the second lens group 12 is a double convex lens D, a meniscus doublet lens EG having its concave side facing rearwardly and bordering a diaphragm space $S_4$. On the rear side of said diaphragm space is located a double concave single lens H and lying contiguously thereto rearwardly is a double convex lens J. The rearmost lens in the second lens group 12 is a single lens K of double convex form, the surface of steepest curvature being on its front surface.

According to this invention, the front group of negative lenses 11 has a negative focal length which is numerically 1.2 to 1.7 times the positive focal length of the rear lens group 12 and the air space $S_2$ therebetween is $1.3F$ to $2.5F$ where F designates the focal length of the optical system, whereby the excess of negative power effects a favorable positive curvature of the image field.

For the purpose of achieving the aforesaid long back focus of the desired magnitude together with an angular field of over 60° and a relative aperture of at least $f/2.0$, the front lens group 11 comprises the aforesaid doublet lens AB and the single lens C, the negative focal length of the AB lens being numerically $7.0F$ to $12.0F$ and the negative focal length of the C lens being $1.28F$ to $3.0F$. The intervening air space $S_1$ between lens AB and lens C lies between $.2F$ and $.5F$. Correspondingly, the focal lengths of the individual lenses D, E, G, H, J, K in the rear lens group 12 together with their intervening air spaces $S_3$, $S_4$, $S_5$, $S_6$ are specified by the following statement of inequalities, $$2.0F < F_D < 3.0F$$
$$-1.0F < F_E < -1.7F$$
$$0.6F < F_G < 1.1F$$
$$-0.7F < F_H < -1.0F$$
$$1.0F < F_J < 1.5F$$
$$1.5F < F_K < 2.5F$$
$$.02F < S_3 < .05F$$
$$.17F < S_4 < .25F$$
$$.03F < S_5 < .06F$$
$$.02F < S_6 < .05F$$

The individual lens thicknesses $t_1$ to $t_9$ used in the entire optical system in achieving the objects of this invention are specified in the following statement of inequalities, $$.40F < t_1 < .80F$$
$$.10F < t_2 < .20F$$
$$.08F < t_3 < .18F$$
$$.15F < t_4 < .25F$$
$$.10F < t_5 < .20F$$
$$.20F < t_6 < .35F$$
$$.09F < t_7 < .15F$$
$$.10F < t_8 < .25F$$
$$.10F < t_9 < .20F$$

Whenever negative lenses are used in the front lens group 11, the difficulty of correcting chromatic abberration is increased. In view of this fact, considerable calculation and experiment have been employed to discover the best values of relative reciprocal dispersion for the A and B lens elements with the result that substantially all chromatic aberration has been eliminated from said front lens group.

Certain specifications for the values of refractive index $n_D$ and the Abbe number $v$ of the respective lenses A to K are given herebelow. The difference between the $n_D$ of the A lens and B lens shall be at least .208 and the corresponding difference of $v$ values should be at least 15.0. The difference between the value of $n_D$ of the A lens and the C lens should lie between .0 and .03 while the $n_D$ values of the A lens and D lens are substantially the same. A further advantage of forming the AB lens as a doublet is obtained by improvement of distortion of the image produced by the optical system.

In accordance with the above-described parameters of the present optical system 10, the range of values for the curvatures $R_1$ to $R_{16}$ of the refractive lens surfaces should be chosen from the statement of inequalities given herebelow.

$2.0F < R_1 < 3.5F$
$-30.0F < R_2 < -50.0F$
$.95F < R_3 < 1.6F$
$1.7F < R_4 < 3.0F$
$.7F < R_5 < 1.4F$
$1.7F < R_6 < 2.5F$
$-15.0F < R_7 < -25.0F$
$1.0F < R_8 < 1.5F$
$.4F < R_9 < .7F$
$1.5F < R_{10} < 2.5F$
$-1.2F < R_{11} < 2.5F$
$.7F < R_{12} < 1.4F$
$1.5F < R_{13} < 2.5F$
$-1.2F < R_{14} < -2.0F$
$1.5F < R_{15} < 2.5F$
$-2.5F < R_{16} < -7.5F$

Of importance is the fact that the steep curvature of the interface $R_9$ has been so chosen as to contribute very greatly toward the correction of spherical aberration in the optical system.

One specific form of my invention is specified in the table shown in FIG. 2 of the drawing and reproduced herebelow wherein, as aforesaid, $R_1$ to $R_{16}$ designate the radius of curvature of the refractive surfaces of the respective lenses which are lettered A to K in order from the front of the optical system, $t_1$ to $t_9$ represent the axial thicknesses of the respective lenses, $S_1$ to $S_6$ designate the air space between said lenses, and $n_D$ and $v$ represent the refractive index and the Abbe number or reciprocal relative dispersion of the optical materials from which said lenses are formed, and E.F.L. and B.F. are the equivalent focal length and back focal length, respectively, of said system.

[E.F.L.=10.0 mm. B.F.=13.21 mm. f/1.8. F.A.=64°]

| Lens | Curvatures | Thicknesses | Spacings | $n_D$ | $v$ |
|---|---|---|---|---|---|
| A | $R_1$ =34.18 | $t_1$=6.87 | | 1.720 | 47.5 |
| B | $R_2$ =−479.83 | $t_2$=1.52 | | 1.498 | 67.0 |
| | $R_3$ =14.56 | | $S_1$=3.13 | | |
| C | $R_4$ =28.63 | $t_3$=1.33 | | 1.720 | 42.0 |
| | $R_5$ =11.73 | | $S_2$=24.07 | | |
| D | $R_6$ =23.59 | $t_4$=2.05 | | 1.720 | 47.5 |
| | $R_7$ =−225.56 | | $S_3$=.04 | | |
| E | $R_8$ =13.24 | $t_5$=1.59 | | 1.651 | 55.8 |
| G | $R_9$ =5.37 | $t_6$=2.96 | | 1.691 | 54.8 |
| | $R_{10}$=21.81 | | $S_4$=2.27 | | |
| H | $R_{11}$=−20.60 | $t_7$=1.32 | | 1.7506 | 27.8 |
| | $R_{12}$=11.31 | | $S_5$=.46 | | |
| J | $R_{13}$=21.51 | $t_8$=1.91 | | 1.657 | 57.2 |
| | $R_{14}$=−16.76 | | $S_6$=.04 | | |
| K | $R_{15}$=18.41 | $t_9$=1.54 | | 1.657 | 57.2 |
| | $R_{16}$=−67.48 | | | | |

A second specific form of my invention is specified in the table shown in FIG. 3 of the drawing and reproduced herebelow wherein all of the designations for the various constructional data given with regard to FIG. 2 have the same meaning in the table herebelow.

[E.F.L.=10.0 mm. B.F.=13.43 mm. f/2.0. F.A.=64°]

| Lens | Curvatures | Thicknesses | Spacings | $n_D$ | $v$ |
|---|---|---|---|---|---|
| A | $R_1$ =23.27 | $t_1$=4.67 | | 1.720 | 47.5 |
| B | $R_2$ =−326.66 | $t_2$=1.02 | | 1.511 | 63.5 |
| | $R_3$ =10.17 | | $S_1$=2.13 | | |
| C | $R_4$ =18.72 | $t_3$=0.89 | | 1.691 | 54.8 |
| | $R_5$ =7.65 | | $S_2$=13.40 | | |
| D | $R_6$ =19.46 | $t_4$=1.69 | | 1.720 | 47.5 |
| | $R_7$ =−186.14 | | $S_3$=0.03 | | |
| E | $R_8$ =10.93 | $t_5$=1.31 | | 1.651 | 55.8 |
| G | $R_9$ =4.43 | $t_6$=2.43 | | 1.691 | 54.8 |
| | $R_{10}$=18.00 | | $S_4$=1.87 | | |
| H | $R_{11}$=−15.65 | $t_7$=1.08 | | 1.7506 | 27.8 |
| | $R_{12}$=9.80 | | $S_5$=0.37 | | |
| J | $R_{13}$=16.11 | $t_8$=1.57 | | 1.657 | 57.2 |
| | $R_{14}$=−14.94 | | $S_6$=0.03 | | |
| K | $R_{15}$=20.09 | $t_9$=1.27 | | 1.657 | 57.2 |
| | $R_{16}$=−28.19 | | | | |

Although only certain forms of my invention have been shown and described in detail, other forms are possible and changes may be made in the form and arrangement of the parts and the details of construction thereof without departing from the spirit of the invention as defined in the claims herebelow.

I claim:

1. A photographic objective having a long back focus for reflex cameras and the like and composed of nine lens elements having constructional data as given in the table of values herebelow wherein $R_1$ to $R_{16}$ are the radii of curvature of the successive refractive lens surfaces named in order from the front of the objective rearwardly, $t_1$ to $t_9$ are the axial thicknesses of the successive lens elements, $S_1$ to $S_6$ are the lengths of the intervening air spaces between said elements, and $n_D$ and $v$ represent the refractive index and Abbe number, respectively,

[E.F.L.=10 mm. B.F.=13.21 mm. Field Angle=64°. Rel. Apert.=f/1.8]

| Lens | Curvatures | Thicknesses | Spacings | $n_D$ | $v$ |
|---|---|---|---|---|---|
| A | $R_1$ =34.18 | $t_1$=6.87 | | 1.720 | 47.5 |
| B | $R_2$=−479.83 | $t_2$=1.52 | | 1.498 | 67.0 |
| | $R_3$ =14.56 | | $S_1$=3.13 | | |
| C | $R_4$ =28.63 | $t_3$=1.33 | | 1.720 | 42.0 |
| | $R_5$ =11.73 | | $S_2$=24.07 | | |
| D | $R_6$ =23.59 | $t_4$=2.05 | | 1.720 | 47.5 |
| | $R_7$ =−225.56 | | $S_3$=0.04 | | |
| E | $R_8$ =13.24 | $t_5$=1.59 | | 1.651 | 55.8 |
| G | $R_9$ =5.37 | $t_6$=2.96 | | 1.691 | 54.8 |
| | $R_{10}$=21.81 | | $S_4$=2.27 | | |
| H | $R_{11}$=−20.60 | $t_7$=1.32 | | 1.7506 | 27.8 |
| | $R_{12}$=11.31 | | $S_5$=0.46 | | |
| J | $R_{13}$=21.51 | $t_8$=1.91 | | 1.657 | 57.2 |
| | $R_{14}$=−16.76 | | $S_6$=0.04 | | |
| K | $R_{15}$=18.41 | $t_9$=1.54 | | 1.657 | 57.2 |
| | $R_{16}$=−67.48 | | | | |

2. A photographic objective having a long back focus for reflex cameras and the like, said objective being composed of nine lens elements having constructional data as given in the table of values herebelow wherein $R_1$ to $R_{16}$ are the radii of curvature of the successive refractive lens surfaces named in order from the front of the objective rearwardly, $t_1$ to $t_9$ are the axial thicknesses of the successive lens elements, $S_1$ to $S_6$ are the lengths of the intervening air spaces between said elements, and $n_D$ and $\nu$ represent the refractive index and Abbe number, respectively,

[E.F.L.=10 mm. B.F.=13.43 mm. F.A.=64°. Rel. Apert.=f/2.0]

| Lens | Curvatures | Thicknesses | Spacings | $n_D$ | $\nu$ |
|------|------------|-------------|----------|-------|-------|
| A    | $R_1 = 23.27$ | $t_1 = 4.67$ | | 1.720 | 47.5 |
|      | $R_2 = -326.66$ | | | | |
| B    | $R_3 = 10.17$ | $t_2 = 1.02$ | | 1.511 | 63.5 |
|      | $R_4 = 18.72$ | | $S_1 = 2.13$ | | |
| C    | $R_5 = 7.65$ | $t_3 = 0.89$ | | 1.691 | 54.8 |
|      | $R_6 = 19.46$ | | $S_2 = 13.40$ | | |
| D    | $R_7 = -186.14$ | $t_4 = 1.69$ | | 1.720 | 47.5 |
|      | $R_8 = 10.93$ | | $S_3 = 0.03$ | | |
| E    | $R_9 = 4.43$ | $t_5 = 1.31$ | | 1.651 | 55.8 |
| G    | $R_{10} = 18.00$ | $t_6 = 2.43$ | | 1.691 | 54.8 |
|      | $R_{11} = -15.65$ | | $S_4 = 1.87$ | | |
| H    | $R_{12} = 9.80$ | $t_7 = 1.08$ | | 1.7506 | 27.8 |
|      | $R_{13} = 16.11$ | | $S_5 = 0.37$ | | |
| J    | $R_{14} = -14.94$ | $t_8 = 1.57$ | | 1.657 | 57.2 |
|      | $R_{15} = 20.09$ | | $S_6 = 0.03$ | | |
| K    | $R_{16} = -28.19$ | $t_9 = 1.27$ | | 1.657 | 57.2 |

References Cited in the file of this patent

UNITED STATES PATENTS 2,785,603  Cook ------------------ Mar. 9, 1957

UNITED STATES PATENT OFFICE
CERTIFICATE OF CORRECTION

Patent No. 3,064,533            November 20, 1962

Lena M. Hudson

It is hereby certified that error appears in the above numbered patent requiring correction and that the said Letters Patent should read as corrected below.

Column 2, line 18, for "1.28F" read --- 1.8F ---.

Signed and sealed this 14th day of May 1963.

(SEAL)
Attest:

ERNEST W. SWIDER            DAVID L. LADD
Attesting Officer            Commissioner of Patents